(12) United States Patent
Gertitschke et al.

(10) Patent No.: US 7,448,183 B2
(45) Date of Patent: Nov. 11, 2008

(54) APPARATUS FOR SEALING A COVER FOIL TO A BLISTER FOIL

(75) Inventors: Detlev Gertitschke, Laupheim (DE); Jürgen Matzenmüller, Bellamont (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 0 days.

(21) Appl. No.: 11/482,551

(22) Filed: Jul. 7, 2006

(65) Prior Publication Data

US 2007/0006549 A1 Jan. 11, 2007

(30) Foreign Application Priority Data

Jul. 9, 2005 (DE) .................. 10 2005 032 177

(51) Int. Cl.
*B65B 51/16* (2006.01)
*B65B 57/02* (2006.01)
*B65B 47/00* (2006.01)

(52) U.S. Cl. .................. 53/329.4; 53/51; 53/477; 53/559

(58) Field of Classification Search .............. 53/75, 53/173, 559, 560, 453, 454, 467, 51, 375.4, 53/329.4, 477; 264/241, 283, 297.6; 425/388, 425/436 RM, 505
See application file for complete search history.

(56) References Cited

U.S. PATENT DOCUMENTS 2,970,414 A * 2/1961 Rohdin .................... 53/453
3,385,025 A * 5/1968 Lemelson ................. 53/453
3,399,509 A * 9/1968 Greco et al. .............. 53/374.4
3,848,393 A * 11/1974 Monoghan ................ 53/427
4,095,397 A * 6/1978 Schilte .................... 53/329.3
4,750,318 A * 6/1988 Matsuzawa ............... 53/559
4,848,066 A * 7/1989 Luhman ................... 53/485
5,366,685 A * 11/1994 Fujii et al. ................ 264/547
5,679,381 A * 10/1997 Andersen et al. .......... 425/104
6,269,615 B1 * 8/2001 Amborn et al. ............. 53/493

FOREIGN PATENT DOCUMENTS

DE 103 47 777 12/2004
DE 102 004 010202 3/2005

* cited by examiner

*Primary Examiner*—Paul R. Durand
(74) *Attorney, Agent, or Firm*—Andrew Wilford

(57) ABSTRACT

A pocket roll centered on and rotatable about a respective axis has an outer surface formed with an array of open pockets separated by directed lands. The pocket-roll outer surface has a predetermined coefficient of friction. A blister foil is fed to the pocket roll with blisters of the blister foil fitting in the pockets. A seal roll rotatable about a respective axis adjacent the pocket roll has an outer surface pressing a cover foil against the blister foil so that the foils are pinched between the rolls. Slip inserts set in at least some of the lands, extend axially of the pocket-roll axis and form in the respective lands axially extending outer-surface regions having coefficients of friction smaller than the coefficient of friction of the pocket-roll outer surface. A position-correcting unit has a sensor and detects and adjusts the positions of the blisters relative to the direction.

11 Claims, 2 Drawing Sheets

APPARATUS FOR SEALING A COVER FOIL TO A BLISTER FOIL

FIELD OF THE INVENTION

The present invention relates to a blister-packing system. More particularly this invention concerns an apparatus for sealing a cover foil to a blister foil.

BACKGROUND OF THE INVENTION

A standard blister pack is typically made by feeding a flat cover foil and a blister foil having preferably filled blisters to the nip between a sealing roll and a blister roll. The sealing roll is oriented above the pocket roll and has a smooth and cylindrical outer surface. The pocket roll has a cylindrical outer surface formed with an array of pockets spaced to fit complementary with the filled pockets of the blister foil, which is fed horizontally to the nip with its blisters open upward. The cover foil and blister foil are pressed together so that they fuse where the seal-roll outer surface presses the foils together against the lands between the pockets of the blister roll.

Since it is absolutely critical that the blisters be perfectly centered in the pockets of the pocket roll, a system is provided for detecting and adjusting the position of the blister foil in the tangential feed direction. This means includes a sensor that detects the positions of the pockets and that is coupled to the drive for the pocket roll so that it can determine when the blisters are drifting from on-center positions.

In DE 10 2004 010 202 of J. Riekenbrauck such a device is described that provides for the continuous sealing of the blister foil with strict correlation of the blisters in the blister foil with the pockets in the surface of the pocket roll. For this purpose, the device has a two-part pocket roll whose effective diameter can be varied slightly so as to compensate for non-alignment of the blisters with the pockets of the pocket roll. This device has proven of value in practice regarding the application for which the device is designed. It is, however, not possible to process blister foil displacement beyond about 1% with this device.

OBJECTS OF THE INVENTION

It is therefore an object of the present invention to provide an improved blister-sealing apparatus.

Another object is the provision of such an improved blister-sealing apparatus that overcomes the above-given disadvantages, in particular that can accommodate blister shift of more than 1%.

SUMMARY OF THE INVENTION

An apparatus for sealing a cover foil to a blister foil has according to the invention a pocket roll centered on and rotatable about a respective axis and having an outer surface formed with an array of radially outwardly open pockets separated by radially outwardly directed lands. The pocket outer surface has a predetermined coefficient of friction. The blister foil is fed in a tangential direction to the pocket roll with blisters of the blister foil fitting in the pockets. A seal roll rotatable about a respective axis adjacent the pocket roll has an outer surface pressing a cover foil against the blister foil so that the foils are pinched between the rolls. According to the invention slip inserts set in at least some of the lands, extend axially of the pocket-roll axis and form in the respective lands axially extending outer-surface regions having coefficients of friction smaller than the coefficient of friction of the pocket-roll outer surface. A position-correcting unit has a sensor and detects and adjusts the positions of the blisters relative to the direction.

This device has the advantage that with each turn of the pocket roll at a certain moment, namely the so-called "12-o'clock-position," the low-friction zone engages the blister foil and the friction between the blister foil and the pocket roll is reduced, allowing easy adjustment of the blister foil and the pocket roll relative to each other, which for example can also be achieved by a regulation of the tension in the blister foil. Thanks to the invention, particularly the disadvantages are avoided created when tension is regulated, especially when the braking force the position adjustment is applied at a considerable distance from the pinch rolls and thus a high percentage of elastic deformation of the blister foil is caused which is disadvantageous for the position-correct synchronization of the blisters with the pockets. Due to the arrangement according to the invention of a zone with reduced coefficient of friction in the outer surface of the pocket roll, the need to reduce the sealing force in order to achieve the desired slip of the blister foil compared to the pocket roll is eliminated.

It is especially preferred in the framework of the invention when several low-friction zones are angularly equispaced over the blister-roll outer surface and divide the respective lands into two regions of the same angular dimension. Due to the presence of several low-friction zones in the outer surface of the pocket roll it is possible to adjust the position of the cavity regarding the position of the blisters in the blister foil several times for each revolution of the pocket roll, since one of the low-friction zones is in the 12-o'clock-position, that is aligned between the axes of the sealing and pocket rolls, more frequently.

It is furthermore provided that the pockets are formed between the lands so that the reduced coefficient of friction is not effective when the blister foil is sealed to the cover foil.

It contributes to the achievement of this object that the angular width of each land corresponds to the width of the blister package to be stamped out of the blister foil sealed with the cover foil, thus during the sealing of a surface corresponding to a blister package a constant coefficient of friction is given and the readjustment of the position of the blisters relative to the pockets is preferably carried out only after sealing of a complete blister package.

It is furthermore provided in the framework of the invention that axis-parallel grooves are formed in the pocket roll for every low-friction zone, and each groove holds a respective low-slip insert whose surface forms the respective the low-friction zone. In this design there is the possibility of optimally adjusting the coefficient of friction for the material of the blister foil to be processed by the choice of the appropriate insert. An insert suitable for use with a large number of different materials of blister foils is composed of polytetrafluoroethylene (PTFE).

An enhanced variability of the insert of the device according to the invention is provided when the insert is replaceably arranged in the groove, thus it is not always necessary to replace the complete pocket roll if the coefficient of friction is to be optimized, as therefore only the corresponding insert has to be replaced.

In addition to the use of the low-friction insert there is also the possibility that in the low-friction zone with the reduced coefficiet of friction a coating is applied to the surface of the pocket roll, although the coating can also be applied to the surface of the insert.

A further preferred embodiment of the invention is characterized in that for the introduction of a tensile force in the blister foil a tensioner adjacent is provided near the pocket roll. This embodiment has the advantage that due to the close juxtaposition of the tensioner to the pocket roll the length of the blister foil between the tensioner and the pocket roll is narrowly limited and thus also elastic deformation of the blister foil after introduction of the tensile force is minimized. It has proven to be advantageous if the tensioner is formed by two rolls or two gripper plates.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
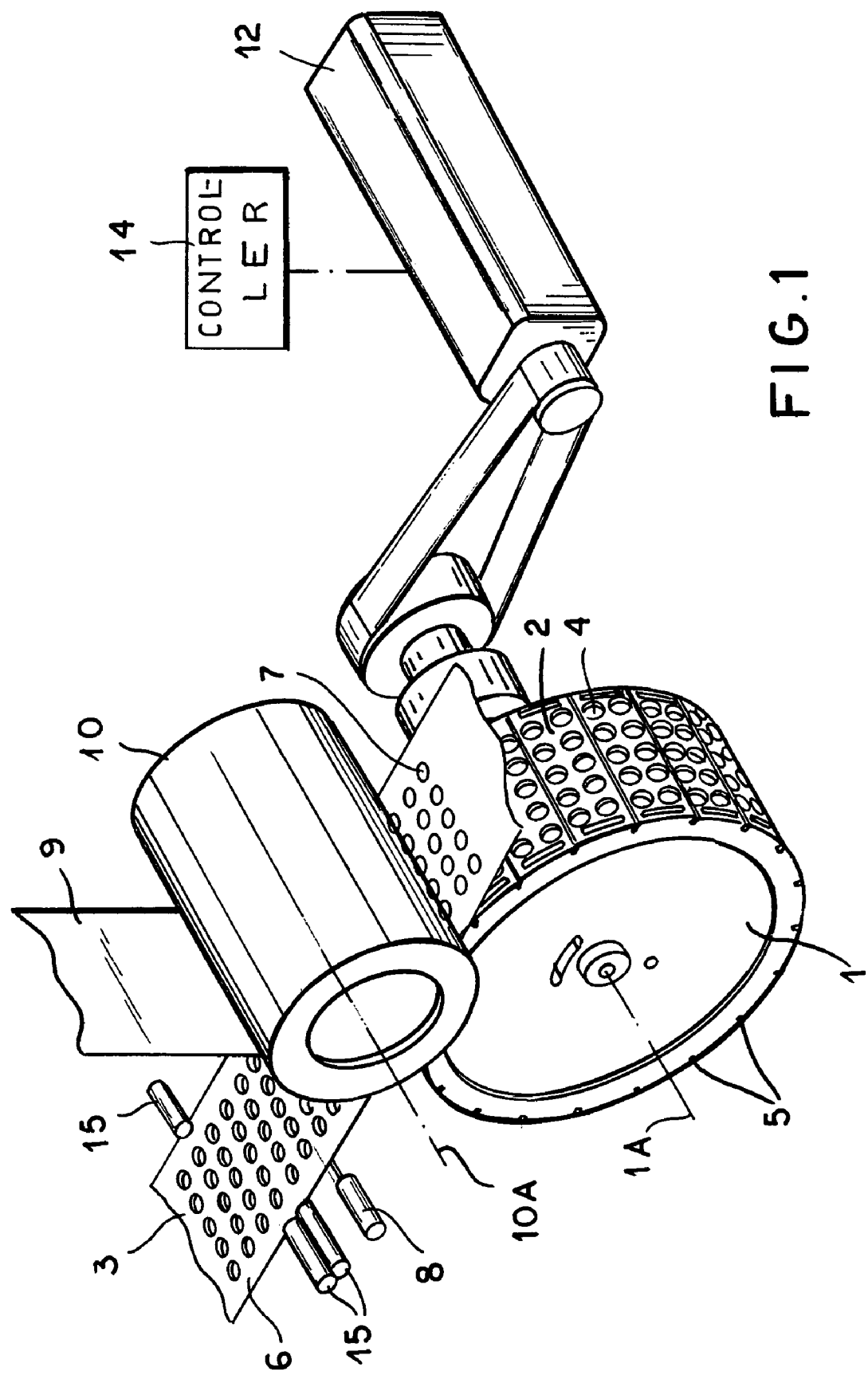
FIG. 1 is a partly schematic perspective illustration of the device according to the invention.

FIG. 1 shows an apparatus for sealing a foil 3 formed with normally filled blisters 6 with a cover foil 9 so that the blister foil 3 blisters 6 filled with products are provided, which are closed by the cover foil 9. The device has a pocket roll 1 rotated about a horizontal axis 1A by a drive 12 and has pockets 4 in the outer surface for the blisters 6 and a heated seal roll 10 acting on it and centered on a respective horizontal axis 10A. The blister foil 3 and the cover foil 9 are fed along a horizontal plane P in a direction D to the nip between the pocket roll 1 and the sealing roll 10 so that the blister foil 3. Furthermore, due to the horizontal feeding, curving in the area of the sealing which could cause damages is avoided.

The blister foil 3 has a coordinated sensor 8 as part of a control system 14 for determining the position of the blisters 6 in order to be able to ensure that the blisters 6 always engage in the centers of the pockets 4 and thus damage to the blisters 6 by the edges of the pockets 4 can be avoided. If the sensor 8 detects a position divergence of the blister 6 in the blister foil 3 from the set value, a tension is applied to the blister foil 3 by means of a tensioner, wherein the tensioner is adjacent to the pocket roll 1. For reasons of clarity this tensioner illustrated schematically in FIG. 2 as the drawing and can be formed for example by two sets of gripper rolls 15 or two plates.

In order to be able to achieve some slip of the blister foil 3 on to the pocket roll 1 without a reduction of the sealing force, that is the compression the two rolls 1 and 10 exert in the plane of their axes 1A and 10A on the foils 6 and 9 for adjustment of the position of the blisters 6 relative to the pockets 4, the outer surface of the pocket roll 1 is fitted with low-friction zones 5 with a reduced coefficient of friction compared to the complementary outer surface of the seal roll 10. In the embodiment illustrated in the drawing there are several low-friction zones 5 evenly spaced about the circumference, so that lands 2 of the outer surface which extend between the pockets 4 are separated into sections of the same angular dimension. The angular width of each land 2 corresponds to the width of the blister packages 7 to be stamped out of the blister foil 3 sealed with the cover foil 9.

Figure 2:
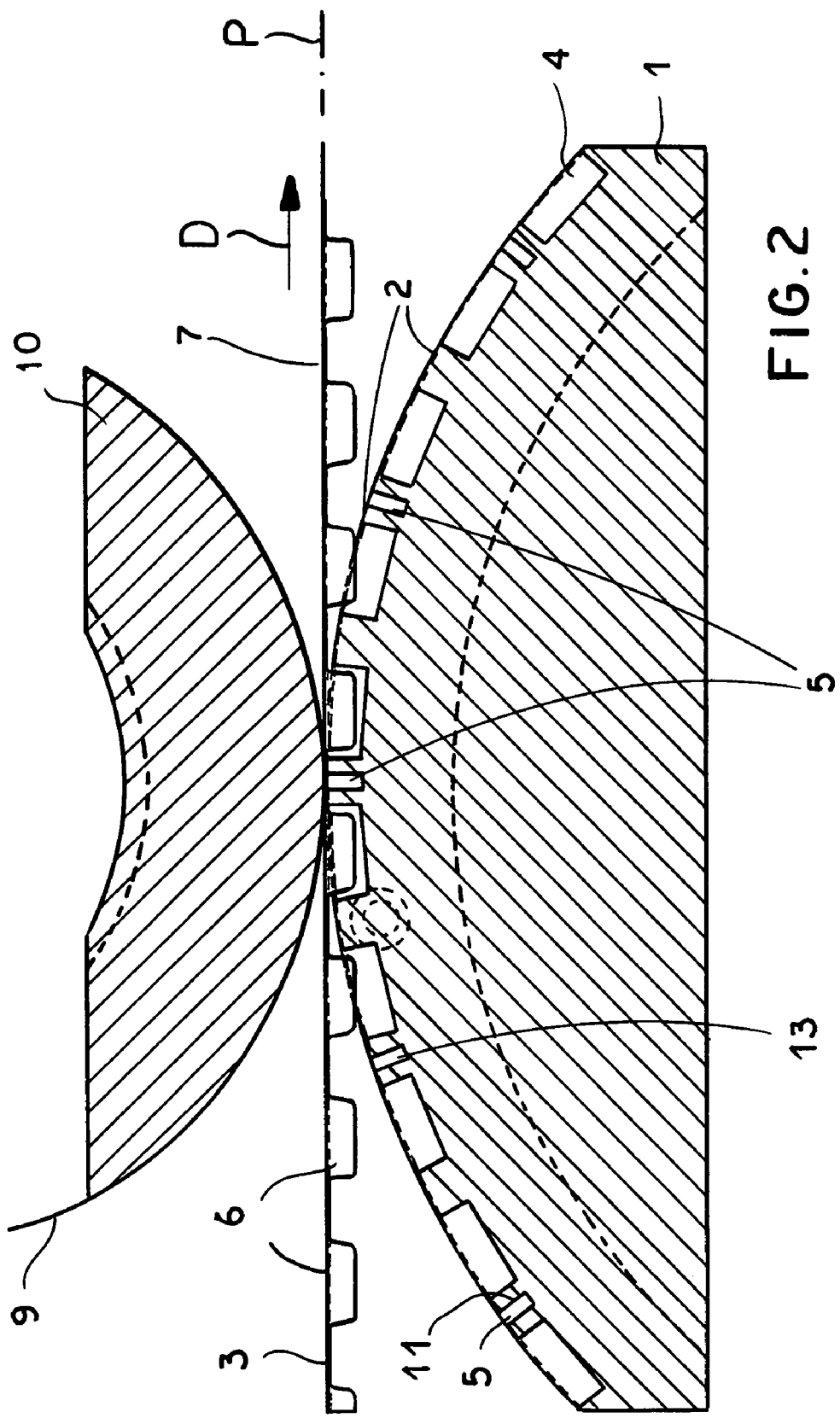
FIG. 2 is a large-scale sectional side view the region the seal roll and the pocket roll with the low-friction zones on its outer surface.

FIG. 2 shows that one of the low-friction zones 5 is in the so-called 12-o'clock-position, thus this low-friction zone 5 forms the surface which together with the seal roll 10 acts on the blister foil 3 and the cover foil 9. This figure also shows that parallel to the axis of the pocket roll 1 for every low-friction zone 5 there is a groove 11 in the outer surface, in which an insert 13 forming the respective low-friction zone 5 is situated. Polytetrafluoroethylene (PTFE) has proven to be a particularly suitable material for the insert 13. The insert 13 can be replaced in the groove 11 in order to ensure an adequate choice of material for the insert 13 according to the type of blister foil to be processed.

We claim:

1. An apparatus for sealing a cover foil to a blister foil, the apparatus comprising:
    a pocket roll centered on and rotatable about a respective axis and having an outer surface formed with an array of radially outwardly open pockets separated by radially outwardly directed lands, the pocket-roll outer surface having a predetermined coefficient of friction;
    means for feeding the blister foil in a tangential direction to the pocket roll with blisters of the blister foil fitting in the pockets;
    a seal roll rotatable about a respective axis adjacent the pocket roll and having an outer surface pressing a cover foil against the blister foil, whereby the foils are pinched between the rolls;
    a plurality of elongated slip inserts set in at least some of the lands, extending axially of the pocket-roll axis between and past the pockets, and forming in the respective lands between the pockets axially extending outer-surface regions having coefficients of friction smaller than the coefficient of friction of the pocket-roll outer surface; and
    means including a sensor for detecting and adjusting the positions of the blisters relative to the direction by sliding the blister foil on the slip inserts of the pocket roll.

2. The sealing apparatus defined in claim 1 wherein the axes of the pocket roll and seal roll are parallel and horizontal.

3. The sealing apparatus defined in claim 1 wherein the slip inserts are set in respective radially outwardly open and axially extending grooves in the respective lands.

4. The sealing apparatus defined in claim 3 wherein the slip inserts are removably mounted in the respective grooves.

5. The sealing apparatus defined in claim 1 wherein the slip inserts are made of polytetrafluoroethylene.

6. The sealing apparatus defined in claim 1 wherein the slip insert is a coating applied to the respective land.

7. The sealing apparatus defined in claim 1 wherein the means for detecting and adjusting includes means for gripping and applying tension to the blister foil.

8. The sealing apparatus defined in claim 7 wherein the means for detecting and adjusting includes a pair of pinch rolls adjacent the pocket and sealing rolls.

9. An apparatus for sealing a cover foil to a blister foil, the apparatus comprising:
    a pocket roll centered on and rotatable about a respective axis and having an outer surface formed with an array of radially outwardly open pockets separated by radially outwardly directed lands, the pocket-roll outer surface having a predetermined coefficient of friction;
    means for feeding the blister foil in a tangential direction to the pocket roll with blisters of the blister foil fitting in the pockets;
    a seal roll rotatable about a respective axis adjacent the pocket roll and having an outer surface pressing a cover foil against the blister foil, whereby the foils are pinched between the rolls;
    a plurality of elongated slip inserts set in at least some of the lands, extending axially of the pocket-roll axis between and past the pockets, and forming in the respective lands between the pockets axially extending outer-surface regions having coefficients of friction smaller than the coefficient of friction of the pocket-roll outer surface, the slip inserts being angularly equispaced about the pocket-roll axis; and means including a sensor for detecting and adjusting the positions of the blisters relative to the direction by sliding the blister foil on the slip inserts of the pocket roll.

10. The sealing apparatus defined in claim 9 wherein each of the lands provided with a slip insert is subdivided by the respective slip insert into two regions of the same angular dimension.

11. The sealing apparatus defined in claim 9 wherein each land had an angular dimension equal to a spacing between adjacent blisters of the blister foil.

* * * * *